US012560455B2

(12) United States Patent
Ferguson et al.

(10) Patent No.: US 12,560,455 B2
(45) Date of Patent: Feb. 24, 2026

(54) METHODS AND SYSTEMS FOR CALIBRATING SENSORS USING ROAD MAP DATA

(71) Applicant: Waymo LLC, Mountain View, CA (US)

(72) Inventors: Dave Ferguson, Mountain View, CA (US); Dorel Ionut Iordache, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 183 days.

(21) Appl. No.: 18/430,279

(22) Filed: Feb. 1, 2024

(65) Prior Publication Data

US 2024/0219203 A1 Jul. 4, 2024

Related U.S. Application Data

(63) Continuation of application No. 17/650,698, filed on Feb. 11, 2022, now Pat. No. 11,913,807, which is a
(Continued)

(51) Int. Cl.
| | |
|---|---|
| *G01C 25/00* | (2006.01) |
| *G01C 21/00* | (2006.01) |
| *G01C 21/30* | (2006.01) |
| *G01S 7/484* | (2006.01) |
| *G01S 7/486* | (2020.01) |
(Continued)

(52) U.S. Cl.
CPC .......... *G01C 25/00* (2013.01); *G01C 21/005* (2013.01); *G01C 21/30* (2013.01); *G01S 7/484* (2013.01); *G01S 7/4868* (2013.01); *G01S*

*7/4972* (2013.01); *G01S 11/12* (2013.01); *G01S 13/86* (2013.01); *G01S 13/931* (2013.01); *G01S 17/86* (2020.01); *G01S 17/87* (2013.01); *G01S 17/89* (2013.01); *G01S 17/931* (2020.01); *G01S 19/40* (2013.01); *G01S 3/781* (2013.01);
(Continued)

(58) Field of Classification Search
USPC .......................................................... 701/446
See application file for complete search history.

(56) References Cited

U.S. PATENT DOCUMENTS

| | | | |
|---|---|---|---|
| 5,852,791 | A | 12/1998 | Sato et al. |
| 6,442,476 | B1 | 8/2002 | Poropat |
(Continued)

*Primary Examiner* — Paul D Lee
(74) *Attorney, Agent, or Firm* — McDonnell Boehnen Hulbert & Berghoff LLP

(57) ABSTRACT

Example methods and systems for calibrating sensors using road map data are provided. An autonomous vehicle may use various vehicle sensors to assist in navigation. Within examples, the autonomous vehicle may calibrate vehicle sensors through performing a comparison or analysis between information about the environment received by sensors with similar information provided by map data (e.g., a road map). The autonomous vehicle may compare object locations as provided by the sensors and as shown by map data. Based on the comparison, the autonomous vehicle may adjust various sensors to accurately reflect the information as provided by the road map. In some instances, the autonomous vehicle may adjust the position, height, orientation, direction-of-focus, scaling, or other parameters of a sensor based on the information provided by a road map.

20 Claims, 5 Drawing Sheets

Related U.S. Application Data continuation of application No. 16/939,797, filed on Jul. 27, 2020, now Pat. No. 11,287,284, which is a continuation of application No. 15/631,642, filed on Jun. 23, 2017, now Pat. No. 10,724,865, which is a continuation of application No. 13/948,457, filed on Jul. 23, 2013, now Pat. No. 9,719,801.

(51) Int. Cl.

| | |
|---|---|
| *G01S 7/497* | (2006.01) |
| *G01S 11/12* | (2006.01) |
| *G01S 13/86* | (2006.01) |
| *G01S 13/931* | (2020.01) |
| *G01S 17/86* | (2020.01) |
| *G01S 17/87* | (2020.01) |
| *G01S 17/89* | (2020.01) |
| *G01S 17/931* | (2020.01) |
| *G01S 19/40* | (2010.01) |
| *G01S 3/781* | (2006.01) |
| *G01S 5/16* | (2006.01) |
| *G06V 20/56* | (2022.01) |

(52) U.S. Cl.
  CPC ................ *G01S 5/16* (2013.01); *G06V 20/56* (2022.01); *G06V 20/588* (2022.01)

(56) References Cited

U.S. PATENT DOCUMENTS

| | | | |
|---|---|---|---|
| 8,352,112 B2 | 1/2013 | Mudalige | |
| 8,364,334 B2 | 1/2013 | Au | |
| 8,412,449 B2 | 4/2013 | Trepagnier | |
| 8,452,524 B2 | 5/2013 | Groitzsch | |
| 8,736,463 B1 | 5/2014 | Zhu et al. | |
| 8,949,016 B1 | 2/2015 | Ferguson et al. | |
| 9,043,072 B1* | 5/2015 | Tisdale | G05D 1/027 |
| | | | 701/28 |
| 9,062,979 B1 | 6/2015 | Ferguson et al. | |
| 9,221,396 B1 | 12/2015 | Zhu | |
| 9,691,282 B2* | 6/2017 | Hartmann | G08G 1/165 |
| 9,719,801 B1 | 8/2017 | Ferguson et al. | |
| 2005/0134440 A1 | 6/2005 | Breed | |
| 2007/0152804 A1 | 7/2007 | Breed et al. | |
| 2007/0213927 A1 | 9/2007 | Ishigami | |
| 2008/0243378 A1* | 10/2008 | Zavoli | G01C 21/28 |
| | | | 701/533 |
| 2009/0228204 A1 | 9/2009 | Zavoli | |
| 2009/0315913 A1 | 12/2009 | Nagashima et al. | |
| 2010/0076708 A1 | 3/2010 | Hukkeri | |
| 2010/0198513 A1* | 8/2010 | Zeng | G01S 13/931 |
| | | | 701/300 |
| 2010/0332119 A1 | 12/2010 | Geelen | |
| 2011/0224901 A1* | 9/2011 | Aben | G01C 21/3819 |
| | | | 701/532 |
| 2012/0083960 A1 | 4/2012 | Zhu | |
| 2012/0310466 A1 | 12/2012 | Fairfield | |
| 2013/0054129 A1 | 2/2013 | Wong | |
| 2013/0103303 A1 | 4/2013 | Lynch | |
| 2014/0153788 A1 | 6/2014 | Ma et al. | |

* cited by examiner

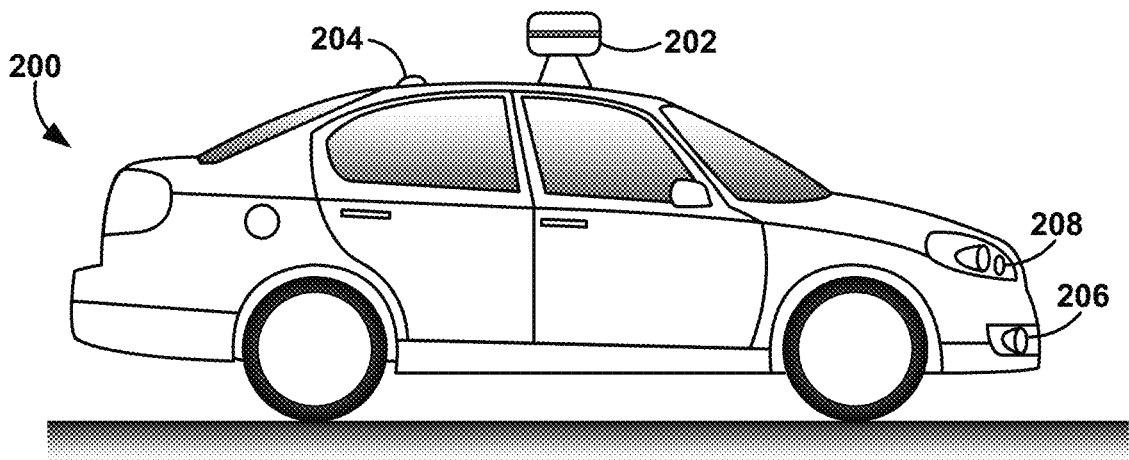
RIGHT SIDE VIEW
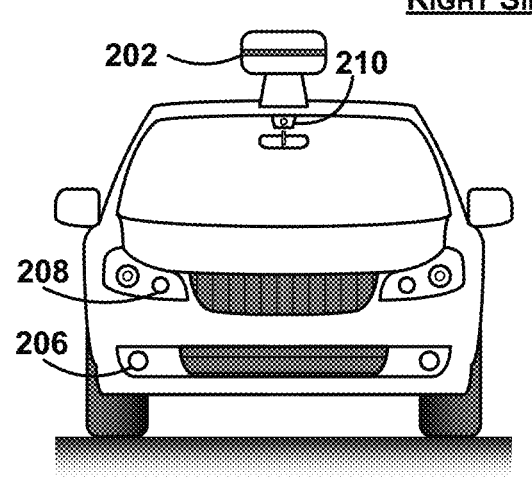
FRONT VIEW
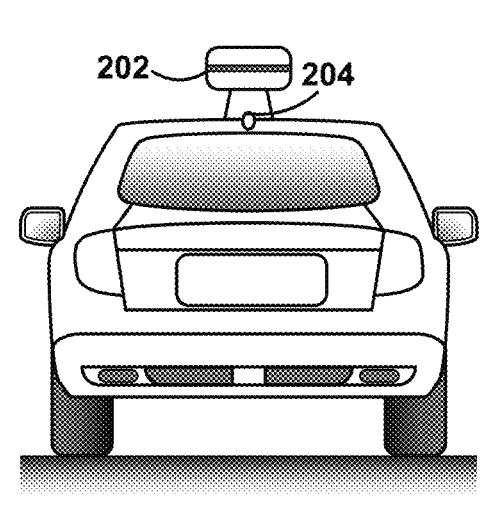
BACK VIEW
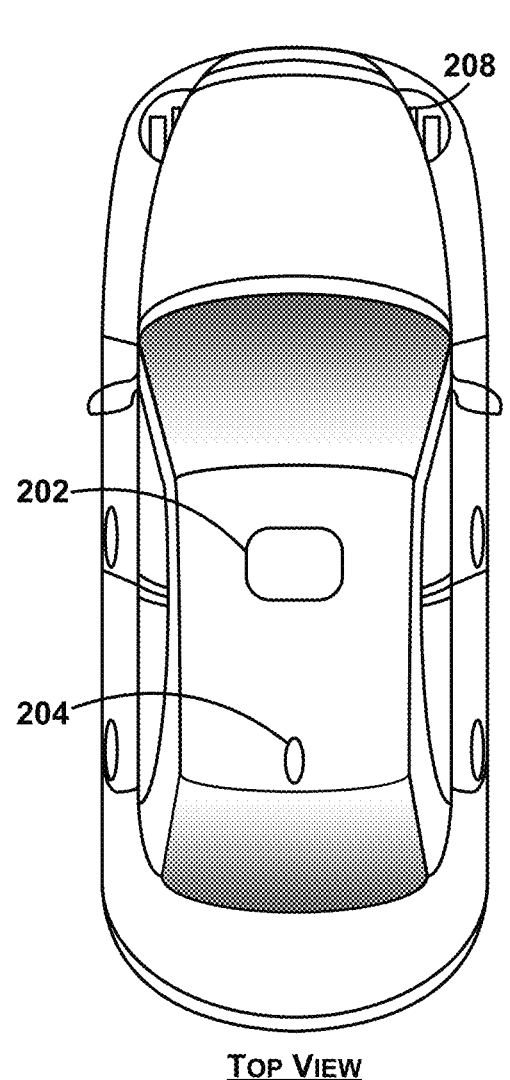
TOP VIEW
FIG. 2

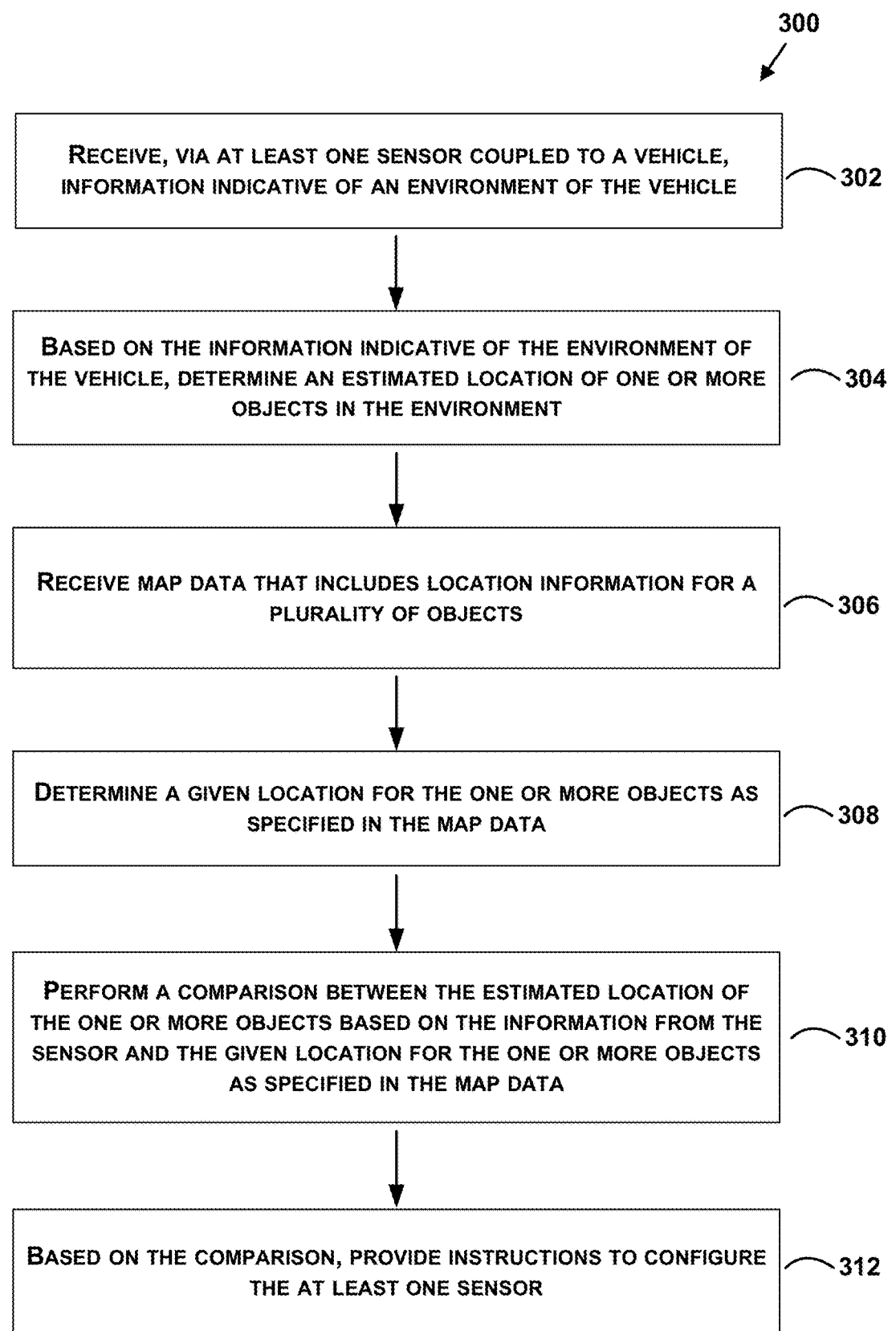

300

RECEIVE, VIA AT LEAST ONE SENSOR COUPLED TO A VEHICLE, INFORMATION INDICATIVE OF AN ENVIRONMENT OF THE VEHICLE ～302

BASED ON THE INFORMATION INDICATIVE OF THE ENVIRONMENT OF THE VEHICLE, DETERMINE AN ESTIMATED LOCATION OF ONE OR MORE OBJECTS IN THE ENVIRONMENT ～304

RECEIVE MAP DATA THAT INCLUDES LOCATION INFORMATION FOR A PLURALITY OF OBJECTS ～306

DETERMINE A GIVEN LOCATION FOR THE ONE OR MORE OBJECTS AS SPECIFIED IN THE MAP DATA ～308

PERFORM A COMPARISON BETWEEN THE ESTIMATED LOCATION OF THE ONE OR MORE OBJECTS BASED ON THE INFORMATION FROM THE SENSOR AND THE GIVEN LOCATION FOR THE ONE OR MORE OBJECTS AS SPECIFIED IN THE MAP DATA ～310

BASED ON THE COMPARISON, PROVIDE INSTRUCTIONS TO CONFIGURE THE AT LEAST ONE SENSOR ～312

FIG. 3

METHODS AND SYSTEMS FOR CALIBRATING SENSORS USING ROAD MAP DATA

CROSS-REFERENCE TO RELATED APPLICATIONS

The present patent application is a continuation of U.S. patent application Ser. No. 17/650,698, filed on Feb. 11, 2022, which is a continuation of U.S. patent application Ser. No. 16/939,797 (now U.S. Pat. No. 11,287,284), filed on Jul. 27, 2020, which is a continuation application of U.S. patent application Ser. No. 15/631,642 (now U.S. Pat. No. 10,724, 865), filed on Jun. 23, 2017, which is a continuation application of U.S. patent application Ser. No. 13/948,457 (now U.S. Pat. No. 9,719,801), filed on Jul. 23, 2013, the entire contents of all of which are hereby incorporated by reference.

BACKGROUND

Unless otherwise indicated herein, the materials described in this section are not prior art to the claims in this application and are not admitted to be prior art by inclusion in this section.

Autonomous vehicles may use various computing systems to aid in the transport of passengers from one location to another. Some autonomous vehicles may require an initial input or continuous input from an operator, such as a pilot, driver, or passenger. Other autonomous systems, for example autopilot systems, may be used when the system has been engaged, which permits the operator to switch from a manual mode (where the operator exercises a high degree of control over the movement of the vehicle) to an autonomous mode (where the vehicle essentially drives itself) to modes that lie somewhere in between.

Such vehicles are typically equipped with various types of sensors in order to detect objects in the surroundings. For example, an autonomous vehicle may include lasers, sonar, radar, cameras, and other devices which scan and record data from surroundings of the vehicle. Sensor data from one or more of these devices may be used to detect objects and their respective characteristics (position, shape, heading, speed, etc.). This detection and identification is useful for the safe operation of autonomous vehicle.

SUMMARY

Within examples, devices and methods calibrating sensors using road map data are provided.

In one example, a method is provided that comprises receiving, via at least one sensor coupled to a vehicle, information indicative of an environment of the vehicle. The method may include based on the information indicative of the environment of the vehicle, determining an estimated location of one or more objects in the environment. The method may also include receiving map data that includes location information for a plurality of objects, and the plurality of objects includes the one or more objects. The method may further comprise determining a given location for the one or more objects as specified in the map data and performing a comparison between the estimated location of the one or more objects based on the information from the sensor and the given location for the one or more objects as specified in the map data. The method may include based on the comparison, providing instructions to configure the at least one sensor.

In another example, a non-transitory computer readable storage medium having stored therein instructions, that when executed by a computing device, cause the computing device to perform functions. The functions comprise receiving, via at least one sensor coupled to a vehicle, information indicative of an environment of the vehicle. The functions may include based on the information indicative of the environment of the vehicle, determining an estimated location of one or more objects in the environment. The functions may also include receiving map data that includes location information for a plurality of objects, and the plurality of objects includes the one or more objects. The functions may further comprise determining a given location for the one or more objects as specified in the map data and performing a comparison between the estimated location of the one or more objects based on the information from the sensor and the given location for the one or more objects as specified in the map data. The functions may include based on the comparison, providing instructions to configure the at least one sensor.

In still another example, a system is provided that comprises at least one processor, and data storage comprising instructions executable by the at least one processor to cause the system to perform functions. The functions comprise receiving, via at least one sensor coupled to a vehicle, information indicative of an environment of the vehicle. The functions may include based on the information indicative of the environment of the vehicle, determining an estimated location of one or more objects in the environment. The functions may also include receiving map data that includes location information for a plurality of objects, and the plurality of objects includes the one or more objects. The functions may further comprise determining a given location for the one or more objects as specified in the map data and performing a comparison between the estimated location of the one or more objects based on the information from the sensor and the given location for the one or more objects as specified in the map data. The functions may include based on the comparison, providing instructions to configure the at least one sensor.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 2 depicts an example vehicle that can include all or some of the functions described in connection with the vehicle in reference to FIG. 1.

FIG. 3 is a block diagram of an example method for calibrating sensors using road maps, in accordance with at least some embodiments described herein.

DETAILED DESCRIPTION

Figure 1:
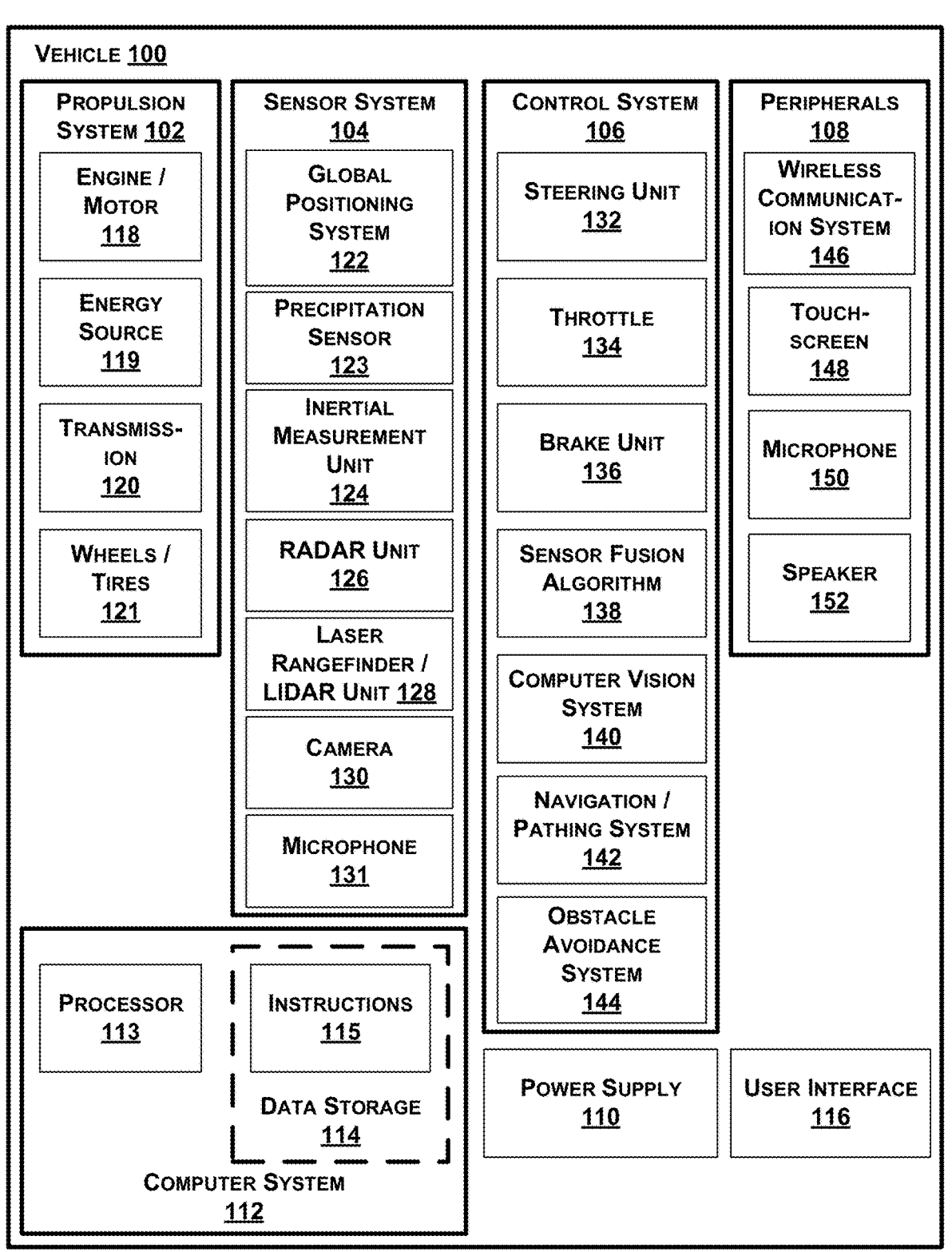
FIG. 1 is a functional block diagram depicting a vehicle according to an example embodiment.

The following detailed description describes various features and functions of the disclosed systems and methods with reference to the accompanying figures. In the figures, similar symbols identify similar components, unless context dictates otherwise, and the figures or components of the figures may not necessarily be drawn to scale for illustration purposes. The illustrative system and method embodiments described herein are not meant to be limiting. It may be readily understood that certain aspects of the disclosed systems and methods can be arranged and combined in a wide variety of different configurations, all of which are contemplated herein.

Within examples, methods and systems are provided for calibrating sensors using road map data. An autonomous vehicle may navigate a path of travel without user intervention and may receive assistance from different sensors associated with the vehicle to avoid requiring user input. Among different types of sensors available, an example autonomous vehicle may be configured to utilize RADAR scans, LIDAR scans, GPS measurements, cameras capturing images, and computer vision functions. An autonomous vehicle may include additional components or modules to provide information. The variety of sensors may be linked to the autonomous vehicle within a network connection or may be directly connected to a portion of the vehicle. In addition to any information provided from the sensors, an autonomous vehicle may use different types of control systems and/or software functions to navigate properly including avoiding possible obstacles and identifying relevant objects. The additional systems may include mechanical or electrical components.

In one example, a method is provided that comprises receiving information about the environment of a vehicle from sensor or sensors associated with the vehicle. A computing device or system associated with an autonomous vehicle may receive environment information from vehicle sensors. In some examples, the computing device or system may receive a variety of information pertaining to a subset of the vehicle sensors. In response to receiving information from various vehicle sensors, the computing device may determine, based entirely or partly on the information received from the sensors, an estimated location of objects in the environment of the vehicle. The computing device may utilize additional information in addition to sensor information to determine estimate locations of objects. In some operations, a computing device may use different types of sensors to obtain information that enables the computing device to estimate the location of different types of objects within the environment. For example, a computing device may utilize the information within laser returns provided by the LIDAR unit of the vehicle to determine the location of lane markers on the surface of a road. In other examples, the computing device of an autonomous vehicle may use RADAR scans or GPS measurements. Similarly, the autonomous vehicle may utilize other types of sensors to provide information to the computing device or system of the vehicle.

In addition examples, an autonomous vehicle may be configured to receive and/or retrieve map data that includes location information for multiple objects, including the objects detected by the sensors. A computing device or another entity associated with an autonomous vehicle may request map data from a server or network of servers based on the information provided by the sensors. The computing device may request map data based on different types of information provided by the vehicle sensors. For example, the computing device may determine a location of the autonomous vehicle from GPS measurements and retrieve map data from a system or server based on the vehicle's location. Similarly, the computing device or system may retrieve map data based on scans executed by the RADAR system or LIDAR unit.

Within examples, the autonomous vehicle may receive map data in various forms, such as road maps or other types of representations that provide information about the surrounding objects within the local environment of the vehicle. Further, the map data may include different information, such as the location of objects, providing distances between objects, or other information.

After receiving the map data, the computing device or system of an autonomous vehicle may determine a given location for the objects as specified in the map data. The computing device may determine a location within the map for the same objects detected in the environment by the sensors. In some examples, the computing device may utilize map-processing software and/or map data-analysis algorithms to determine object locations as specified by the map.

Furthermore, the computing device of an autonomous vehicle may be configured to perform a comparison between the estimated location of the objects based on the information provided by the sensors and the given location for the objects as specified in the map. The autonomous vehicle may perform a comparison or multiple comparisons using different configurations or processes. The computing device may compare the estimated locations of the objects as identified by the vehicle sensors and the locations as specified by the map data. The computing device may apply a comparison software and/or algorithm to identify any differences between the information provided by the sensors and the map data. The road maps may enable an autonomous vehicle to calibrate one or more types of sensors based on the accuracy of the sensors relative to the location of objects as identified by the map.

In some implementations, the computing device may provide instructions, based on the comparison, to systems of the vehicle to configure the sensors or sensors associated with the vehicle. The computing device may conclude from the comparison that the locations of the objects as determined by the vehicle sensors do not match the locations of the same objects as specified by the maps received. In different examples, an autonomous vehicle may be configured to permit a threshold difference between the location as identified by the sensor and the location as identified by the map prior to calibrating the sensors. In the case that the sensors do not match the map information as shown by the comparison, the computing device may utilize the information provided by the map data to adjust the parameters of the sensors to cause the sensors to provide object location information that matches the object locations as specified in the map.

In some instances, the computing device may partially adjust sensors to more closely reflect the information as provided in the received maps. The computing device may adjust multiple sensors or a single sensor, for example. The computing device may adjust various parameters of the sensors, such as the orientation, position, direction-of-focus, and intensity of lasers emitted, timing, or other parameters. The computing device may adjust extrinsic or intrinsic parameters associated with each sensor. Further, the computing device or system may turn off or delay some sensors based on the comparison with map data. In some implementations, an autonomous vehicle may be configured to adjust multiple parameters of the sensors prior to performing a test to determine if the computing device should apply further adjustments. A computing device may be equipped with other means to determine if any adjustments to the sensors occurred properly.

As noted, an autonomous vehicle may be equipped to receive information from different sensors of the vehicle, such as cameras, RADAR systems, LIDAR modules, inertial modules, and global positioning system (GPS). Other sensors may be included as well. Further, in some examples, the calibration of sensors may focus on particular types of sensors depending on the circumstances of the environment and map data received by the autonomous vehicle.

By extension, in additional examples, the computing device may receive map data through different means and in various forms. In some examples, the computing device or another entity of an autonomous vehicle may be configured to search a database of maps. The database of maps may be placed remotely or may be equipped within memory of a computing device on the autonomous vehicle. An autonomous vehicle may receive map data wirelessly or through a wired link. In one example, an autonomous vehicle may be configured to develop map data in addition to calibrating sensors. The map data developed may be utilized by the computing device of the autonomous vehicle to adjust positions of sensors.

An autonomous vehicle may receive map data based on information determined by vehicle sensors. In order to calibrate sensors, a computing device may require maps that relate to the sensor information being transmitted to the computing device at that time. The computing device may be capable of receiving maps based on the location of the autonomous vehicle, orientation of the vehicle or sensors, or other parameters.

In examples, map data may be configured as a visual representation of an area, which may show relationships between elements of the space, such as objects, regions, and themes. An autonomous vehicle may receive map data indicative of road maps, which may display roads and other transport links. In some instances, a road map may include roads, boundaries, and points of interest, such as prominent businesses or buildings, tourism sites, parks and recreational facilities, hotels and restaurants, as well as airports and train stations. Road maps may vary in shape, sizes, and scales and may vary in the amount of details provided. A computing device may calibrate sensors of the vehicle based on different types of maps received. The maps may be configured specifically for vehicle sensor calibration. An autonomous vehicle may make a further determination whether to store the map data for future use. The vehicle may store the map data in memory and may gather additional map data based on other stored map data.

Moreover, an autonomous vehicle may receive maps for navigation purposes and may utilize the same maps to adjust vehicle sensors. Different types of sensors may require specific information within the maps received by the autonomous vehicle.

In example implementations, a computing device may identify specific features of objects in the environment to calibrate sensors of the vehicle. The computing device may identify features of the objects, such as a reflective light intensity, color, or texture to distinguish the objects. The sensors may be configured to focus upon the different features of the objects within the environment. Using the features, the computing device may locate the objects as specified in the map. The computing device may utilize the information gained through identifying the features to assist in the calibration of any sensors of the vehicle. Further information may be used to provide a higher confidence level or confirmation of the computing device calibrating the sensors of the vehicle properly.

Example systems within the scope of the present disclosure will now be described in greater detail. Generally, an example system may be implemented in or may take the form of an automobile. However, an example system may also be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

I. Example Vehicle

FIG. 1 is a functional block diagram depicting a vehicle 100 according to an example embodiment. The vehicle 100 is configured to operate fully or partially in an autonomous mode, and thus may be referred to as an "autonomous vehicle." For example, a computer system 112 may control the vehicle 100 while in an autonomous mode via control instructions to a control system 106 for the vehicle 100. The computer system 112 may receive information from a sensor system 104, and base one or more control processes (such as the setting a heading so as to avoid a detected obstacle) upon the received information in an automated fashion.

The vehicle 100 may be fully autonomous or partially autonomous. In a partially autonomous vehicle some functions can optionally be manually controlled (e.g., by a driver) some or all of the time. Further, a partially autonomous vehicle may be configured to switch between a fully-manual operation mode and a partially-autonomous and/or a fully-autonomous operation mode.

The vehicle 100 may include various subsystems such as a propulsion system 102, a sensor system 104, a control system 106, one or more peripherals 108, as well as a power supply 110, a computer system 112, and a user interface 116. The vehicle 100 may include more or fewer subsystems and each subsystem may include multiple elements. Further, each of the subsystems and elements of vehicle 100 may be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion to the vehicle 100. Depending upon the embodiment, the propulsion system 102 may include an engine/motor 118, an energy source 119, a transmission 120, and wheels/tires 121. The engine/motor 118 could be any combination of an internal combustion engine, an electric motor, steam engine, Stirling engine, or other types of engines and/or motors. In some embodiments, the propulsion system 102 may include multiple types of engines and/or motors. For instance, a gas-electric hybrid vehicle may include a gasoline engine and an electric motor. Other examples are possible as well.

The energy source 119 may represent a source of energy that may, in full or in part, power the engine/motor 118. That is, the engine/motor 118 may be configured to convert the energy source 119 into mechanical energy to operate the transmission 120. Examples of energy sources 119 may include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 may also provide energy for other systems of the automobile 100.

The transmission 120 may include elements that are operable to transmit mechanical power from the engine/motor 118 to the wheels/tires 121. Such elements may include a gearbox, a clutch, a differential, a drive shaft, and/or axle(s), etc. The transmission 120 may include other elements as well. The drive shafts may include one or more axles that may be coupled to the one or more wheels/tires 121.

The wheels/tires 121 may be arranged to stably support the vehicle 100 while providing frictional traction with a surface, such as a road, upon which the vehicle 100 moves. Accordingly, the wheels/tires 121 of vehicle 100 may be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 may represent at least one wheel that is fixedly attached to the transmission 120 and at least one tire coupled to a rim of the wheel that could make contact with the driving surface. The wheels/tires 121 may include any combination of metal and rubber, or another combination of materials.

The sensor system 104 generally includes one or more sensors configured to detect information about the environment surrounding the vehicle 100. For example, the sensor system 104 may include a Global Positioning System (GPS) 122, a precipitation sensor 123, an inertial measurement unit (IMU) 124, a RADAR unit 126 (radio detection and ranging), a laser rangefinder/LIDAR unit 128 (laser imaging detection and ranging), a camera 130, and/or a microphone 131. The sensor system 104 may also include sensors configured to monitor internal systems of the vehicle 100 (e.g., $O_2$ monitor, fuel gauge, engine oil temperature, wheel speed sensors, etc.). One or more of the sensors included in the sensor system 104 may be configured to be actuated separately and/or collectively in order to modify a position and/or an orientation of the one or more sensors.

Sensors in the sensor system 104 may be configured to provide data that is processed by the computer system 112 in real-time. For example, sensors may continuously update outputs to reflect an environment being sensed at or over a range of time, and continuously or as-demanded provide that updated output to the computer system 112 so that the computer system 112 can determine whether the vehicle's then current direction or speed should be modified in response to the sensed environment.

The GPS 122 may be any sensor configured to estimate a geographic location of the vehicle 100. To this end, GPS 122 may include a transceiver operable to provide information regarding the position of the vehicle 100 with respect to the Earth.

The precipitation sensor 123 may be mounted under or incorporated into a windshield of the vehicle 100. Precipitation sensors may also be mounted at various other locations, such as at or near a location of headlamps, etc. In one example, the precipitation sensor 123 may include a set of one or more infrared light-emitting diodes (LEDs) and a photodetector such as a photodiode. Light emitted by the LEDs may be reflected by the windshield back to the photodiode. The less light the photodiode receives may be indicative of the more precipitation outside of the vehicle 100. An amount of reflected light or some other indicator of the detected amount of precipitation may be passed to computer system 112.

The IMU 124 may include any combination of sensors (e.g., accelerometers and gyroscopes) configured to sense position and orientation changes of the vehicle 100 based on inertial acceleration.

The RADAR unit 126 may represent a system that utilizes radio signals to sense objects within the local environment of the vehicle 100. In some embodiments, in addition to sensing the objects, the RADAR unit 126 may additionally be configured to sense the speed and/or heading of the objects.

Similarly, the laser rangefinder or LIDAR unit 128 may be any sensor configured to sense objects in the environment in which the vehicle 100 is located using lasers. Depending upon the embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode.

The camera 130 may include one or more devices configured to capture a plurality of images of the environment surrounding the vehicle 100. The camera 130 may be a still camera or a video camera. In some embodiments, the camera 130 may be mechanically movable such as by rotating and/or tilting a platform to which the camera is mounted. As such, a control process of the vehicle 100 may be implemented to control the movement of the camera 130.

The sensor system 104 may also include a microphone 131. The microphone 131 may be configured to capture sound from the environment surrounding the vehicle 100. In some cases, multiple microphones can be arranged as a microphone array, or possibly as multiple microphone arrays.

The control system 106 may be configured to control operation(s) of the vehicle 100 and its components. Accordingly, the control system 106 may include various elements include steering unit 132, throttle 134, brake unit 136, a sensor fusion algorithm 138, a computer vision system 140, a navigation/pathing system 142, and an obstacle avoidance system 144, etc.

The steering unit 132 may represent any combination of mechanisms that may be operable to adjust the heading of vehicle 100. For example, the steering unit 132 can adjust the axis (or axes) of one or more of the wheels/tires 121 so as to effect turning of the vehicle 100. The throttle 134 may be configured to control, for instance, the operating speed of the engine/motor 118 and, in turn, control the speed of the vehicle 100. The brake unit 136 may include any combination of mechanisms configured to decelerate the vehicle 100. The brake unit 136 may, for example, use friction to slow the wheels/tires 121. In other embodiments, the brake unit 136 inductively decelerates the wheels/tires 121 by a regenerative braking process to convert kinetic energy of the wheels/tires 121 to electric current. The brake unit 136 may take other forms as well.

The sensor fusion algorithm 138 may be an algorithm (or a computer program product storing an algorithm) configured to accept data from the sensor system 104 as an input. The data may include, for example, data representing information sensed at the sensors of the sensor system 104. The sensor fusion algorithm 138 may include or be configured to be executed using, for instance, a Kalman filter, Bayesian network, or other algorithm. The sensor fusion algorithm 138 may provide various assessments based on the data from sensor system 104. Depending upon the embodiment, the assessments may include evaluations of individual objects and/or features in the environment of vehicle 100, evaluations of particular situations, and/or evaluations of possible impacts based on the particular situation. Other assessments are possible.

The computer vision system 140 may be any system operable to process and analyze images captured by camera 130 in order to identify objects and/or features in the environment of vehicle 100 that could include traffic signals, road way boundaries, other vehicles, pedestrians, and/or obstacles, etc. The computer vision system 140 may use an object recognition algorithm, a Structure from Motion (SFM) algorithm, video tracking, and other computer vision techniques. In some embodiments, the computer vision system 140 could be additionally configured to map an environment, track objects, estimate the speed of objects, etc.

The navigation and pathing system 142 may be any system configured to determine a driving path for the vehicle 100. For example, the navigation/pathing system 142 may determine a series of speeds and directional headings to effect movement of the vehicle 100 along a path that substantially avoids perceived obstacles while generally advancing the vehicle 100 along a roadway-based path leading to an ultimate destination, which may be set according to user inputs via the user interface 116, for example. The navigation and pathing system 142 may additionally be configured to update the driving path dynamically while the vehicle 100 is in operation. In some embodiments, the navigation and pathing system 142 could be configured to incorporate data from the sensor fusion algorithm 138, the GPS 122, and one or more predetermined maps so as to determine the driving path for vehicle 100.

The obstacle avoidance system 144 may represent a control system configured to identify, evaluate, and avoid or otherwise negotiate potential obstacles in the environment of the vehicle 100. For example, the obstacle avoidance system 144 may effect changes in the navigation of the vehicle 100 by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 may be configured such that a swerving maneuver is not undertaken when other sensor systems detect vehicles, construction barriers, other obstacles, etc. in the region adjacent the vehicle 100 that would be swerved into. In some embodiments, the obstacle avoidance system 144 may automatically select the maneuver that is both available and maximizes safety of occupants of the vehicle. For example, the obstacle avoidance system 144 may select an avoidance maneuver predicted to cause the least amount of acceleration in a passenger cabin of the vehicle 100.

The control system 106 may additionally or alternatively include components other than those shown and described.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. may include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of the vehicle 100, and convey information from the user indicated via the touchscreen 148 to the user interface 116. The touchscreen 148 can be configured to sense both touch positions and touch gestures from the finger of a user (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from an occupant of the vehicle 100. Similarly, the speaker 152 can be configured to output audio to the occupant of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle 100 that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as CDMA, EVDO, GSM/GPRS, and/or 4G cellular communication, such as WiMAX or LTE. Additionally or alternatively, the wireless communication system 146 can communicate with a wireless local area network (WLAN), for example, using WiFi. In some embodiments, the wireless communication system 146 could communicate directly with a device, for example, using an infrared link, short-range wireless link, etc. The wireless communication system 146 can include one or more dedicated short range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

The power supply 110 may provide power to components of the vehicle 100, such as electronics in the peripherals 108, the computer system 112, the sensor system 104, etc. The power supply 110 can include a rechargeable lithium-ion or lead-acid battery for storing and discharging electrical energy to the various powered components, for example. In some embodiments, one or more banks of batteries may be configured to provide electrical power. In some embodiments, the power supply 110 and the energy source 119 can be implemented together, as in some all-electric cars.

Many or all of the functions of the vehicle 100 may be controlled via the computer system 112 that receives inputs from the sensor system 104, the peripherals 108, etc., and communicates appropriate control signals to the propulsion system 102, the control system 106, the peripherals 108, etc. to effect automatic operation of the vehicle 100 based on its surroundings. The computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various automobile functions, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 at during the operation of the vehicle 100 in the autonomous, semi-autonomous, and/or manual modes.

The vehicle 100, and associated computer system 112, provides information to and/or receives input from, a user of the vehicle 100, such as an occupant in a passenger cabin of the vehicle 100. Accordingly, the vehicle 100 may include a user interface 116 for providing information to or receiving input from a user of vehicle 100. The user interface 116 may control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 may utilize input from the control system 106 to control the steering unit 132 to avoid an obstacle detected by the sensor system 104 and the obstacle avoidance system 144. The computer system 112 may be configured to control many aspects of the vehicle 100 and its subsystems. Generally, however, provisions are made for manually overriding automated controller-driven operation, such as in the event of an emergency, or merely in response to a user-activated override, etc.

The components of the vehicle 100 described herein may be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in the data storage 114, and/or by other techniques.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 may generally be communicatively coupled together in a wired and/or wireless fashion.

FIG. 2 depicts an example vehicle 200 that can include all or some of the functions described in connection with the vehicle 100 in reference to FIG. 1. Although example vehicle 200 is illustrated in FIG. 2 as a four-wheel sedan-type car for illustrative purposes, the present disclosure is not so limited. For instance, example vehicle 200 can represent any type of vehicle.

Example vehicle 200 includes a sensor unit 202, a wireless communication system 204, a LIDAR unit 206, a laser rangefinder unit 208, and a camera 210. Furthermore, example vehicle 200 may include any of the components described in connection with vehicle 100 of FIG. 1.

The sensor unit 202 is mounted atop example vehicle 200 and includes one or more sensors configured to detect information about an environment surrounding example vehicle 200, and output indications of the information. For example, the sensor unit 202 may include any combination of cameras, RADARs, LIDARs, range finders, and acoustic sensors. The sensor unit 202 may include one or more movable mounts that may be operable to adjust the orientation of one or more sensors in the sensor unit 202. In one embodiment, the movable mount may include a rotating platform that may scan sensors so as to obtain information from each direction around example vehicle 200. In another embodiment, the movable mount of the sensor unit 202 may be moveable in a scanning fashion within a particular range of angles and/or azimuths. The sensor unit 202 may be mounted atop the roof of a car, for instance, however other mounting locations are possible. Additionally, the sensors of the sensor unit 202 may be distributed in different locations and need not be collocated in a single location. Some possible sensor types and mounting locations include the LIDAR unit 206 and laser rangefinder unit 208. Furthermore, each sensor of the sensor unit 202 may be configured to be moved or scanned independently of other sensors of the sensor unit 202.

The wireless communication system 204 may be located on a roof of example vehicle 200 as depicted in FIG. 2. Alternatively, the wireless communication system 204 may be located, fully or in part, elsewhere. The wireless communication system 204 may include wireless transmitters and receivers that may be configured to communicate with devices external or internal to example vehicle 200. Specifically, the wireless communication system 204 may include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 may be a photo-sensitive instrument, such as a still camera, a video camera, etc., that is configured to capture a plurality of images of the environment of example vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 may provide range information by using a structured light technique in which example vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, example vehicle 200 may determine the distance to the points on the object. The predetermined light pattern may comprise infrared light, or radiation at other suitable wavelengths for such measurements.

The camera 210 may be mounted inside a front windshield of example vehicle 200. Specifically, the camera 210 may be situated to capture images from a forward-looking view with respect to the orientation of example vehicle 200. Other mounting locations and viewing angles of the camera 210 may also be used, either inside or outside example vehicle 200.

The camera 210 can have associated optics operable to provide an adjustable field of view. Further, the camera 210 may be mounted to example vehicle 200 with a movable mount to vary a pointing angle of the camera 210, such as a via a pan/tilt mechanism.

II. Example Method

FIG. 3 is a block diagram of an example method for calibrating sensors using road maps, in accordance with at least some embodiments described herein. Method 300 shown in FIG. 3 presents an embodiment of a method that, for example, could be used with the vehicle 100 and/or vehicle 200 as illustrated and described in reference to FIGS. 1 and 2, respectively, or components of the vehicle 100 or vehicle 200. For example, the processes described herein may be carried out by the RADAR unit 126, the LIDAR unit 128, or camera 130 mounted to an autonomous vehicle (e.g., vehicle 200) in communication with the computer system 112, the sensor fusion algorithm 138, and/or the computer vision system 140. Method 300 may include one or more operations, functions, or actions as illustrated by one or more of blocks 302-312. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions (e.g., machine readable code) executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, a computer program product, or other article of manufacture, for example.

The non-transitory computer readable medium could also be distributed among multiple data storage elements, which could be remotely located from each other. A computing device that executes some or all of the stored instructions could be a vehicle, such as the example vehicle 200 illustrated in FIG. 2. Alternatively, the computing device that executes some or all of the stored instructions could be another computing device, such as a server.

In addition, for the method 300 and other processes and methods disclosed herein, each block in FIG. 3 may represent circuitry that is wired to perform the specific logical functions in the process.

Example methods, such as method 300 of FIG. 3 may be carried out in whole or in part by the vehicle and its subsystems. Accordingly, example methods could be described by way of example herein as being implemented by the vehicle. However, it should be understood that an example method may be implemented in whole or in part by other computing devices of the vehicle or separate from the vehicle. For example, an example method may be implemented in whole or in part by a server system, which receives data from a device such as those associated with the vehicle. Other examples of computing devices or combinations of computing devices that can implement an example method are possible.

At block 302, the method 300 includes receiving, via at least one sensor coupled to a vehicle, information indicative of an environment of the vehicle. As an example, a computing device controlling an autonomous vehicle may be configured to receive information about the environment of the vehicle. The sensors may be positioned on the vehicle to capture different ranges of information relative to the vehicle's position. For example, a vehicle may include cameras connected at different positions to capture images of the environment surrounding the vehicle.

In some instances, the computing device or system may partially control other systems or operations associated with the autonomous vehicle. An autonomous vehicle may be configured with a designated computing device that receives information relating to the environment from various sensors and systems of the vehicle. In an implementation, the computing device may receive the information from a combination of sensors and systems and may receive the information in real-time.

In order to receive information about the environment, an autonomous vehicle may be equipped with sensors, such as cameras, RADAR, LIDAR, and GPS, to acquire a variety of information about the environment. An autonomous vehicle may include other types of sensors or systems as well. The systems may include mechanical or electrical components. The different vehicle sensors may be configured to provide different forms or types of information relating to the environment of the vehicle. For example, a camera system may likely provide images or a series of images of areas surrounding the vehicle. In contrast, a LIDAR unit may provide information about objects pertaining to the location, size, and distance from the vehicle. Thus, the computing device may be configured to differentiate incoming information received from the sensors of the autonomous vehicle. In addition, the computing device may be configured to control and/or operate the sensors through different means, such as providing wired or wireless instructions through different links or systems to the sensors.

For a specific implementation, an autonomous vehicle may receive information about the environment from images captured by one or more cameras. The cameras may be configured to capture images from different points or orientations relative to the vehicle. For example, a camera may be placed to capture images of the environment in front of the vehicle. Other cameras may be connected to the autonomous vehicle at different positions to capture other views of the environment surrounding the vehicle. A computing device may receive images or video from the cameras in real-time. A camera may be linked to other cameras or systems of the vehicle through wired or wireless connections. The computing device may utilize the images to obtain information relating to the objects within the environment. In such implementations, an autonomous vehicle may utilize cameras for navigation assistance, such as identifying and obeying lane boundaries. In addition, a computing device may utilize image-processing software that may detect lane markers, lane stripes, traffic signals, road signs, and other objects.

In another example implementation, an autonomous vehicle may also be configured to receive information about the environment from a LIDAR unit, such as the LIDAR unit shown in FIG. 2. During operation, a LIDAR unit may measure distances between a vehicle and other objects in the environment by illuminating targets with lasers and analyzing the reflected light. An example LIDAR unit may use ultraviolet, visible, or near infrared light to detect objects in the surrounding environment. Upon receiving information from a LIDAR unit, a computing device may be capable of determining distances between the vehicle and various objects within the environment, such as other vehicles, signs, trees, lane markers, or other objects. The computing device may also be capable of determining a size of the object, speed, or location based on the returns provided by a LIDAR unit, for example.

An autonomous vehicle may utilize cameras and LIDAR returns to determine information about the same area in the environment. The different sensors may provide the autonomous vehicle with different information, which may be combined to determine further information about the environment. For example, the camera system may provide an autonomous vehicle with images about a region of the environment and the LIDAR unit may provide laser returns indicative of that same region.

By extension, an autonomous vehicle may be equipped with a RADAR system that may enable the detection of objects in the environment of the vehicle through the use of transmitting and receiving radio waves. Within examples, the RADAR system may provide a computing device of an autonomous vehicle with information indicative of ranges, altitudes, directions of travel, and speeds of objects within the environment. For example, the reflected radio waves received by a RADAR system may identify the location and/or speed of nearby vehicles. Other information may be provided through the use of RADAR and LIDAR as well.

In addition, an autonomous vehicle may be equipped with a global positioning system (GPS), which may provide data regarding the position of the vehicle or other objects relative to a global coordinate system. The GPS may be utilized in addition to other sensors to determine a position of the vehicle relative to intersections, roads, buildings, or other points of interest within the environment that may be depicted within GPS information. The GPS may be utilized to provide information about nearby objects as well.

Furthermore, in other implementations, additional navigation aids may be used as well, such as accelerometers, gyroscopes, and wheel sensors. Moreover, an autonomous vehicle may be configured with different types of systems and software capable of transmitting, receiving, and analyzing information gathered through sensors. An autonomous vehicle may use the various types of systems and sensors in a network in some examples. For example, a computing device may receive information through wired or wireless connections.

At block 304, the method 300 includes based on the information indicative of the environment of the vehicle, determining an estimated location of one or more objects in the environment. An autonomous vehicle may be configured to estimate the location of objects within the environment through utilizing the information provided by the sensors. Within examples, an autonomous vehicle may use information provided by different types of sensors to determine an estimated position, orientation, location, or other information relating to objects in the environment. In some instances, a computing device may execute various software and/or object-detection algorithms to determine estimated locations for the objects in the environment. In examples, an autonomous vehicle may be configured to determine locations of objects using different coordinate systems or relative to the position of the vehicle. Similarly, an autonomous vehicle may determine location of objects relative to different objects or according to information provided by the GPS or other sensors.

In some instances, the autonomous vehicle may use specific sensors to initially detect objects within the environment and other sensors to determine other information related to the objects. For example, an autonomous vehicle may detect objects through LIDAR or RADAR, but then utilize the information provided by other sensors, such as a GPS or images from a camera, to determine an estimated location of the objects. Other combinations may exist as well. For example, an autonomous vehicle may not be confined to utilizing only information provided by designated vehicle sensors to determine locations of objects within the environment.

Within an example implementation, a computing device may identify distinctive features of certain objects within the environment. The features of the objects may assist a computing device to detect and locating the objects within the environment or within maps. Further, the features may also enable the autonomous vehicle to identify similar objects. Possible examples of features that sensors or a computing device may focus upon may include, but are not limited to the reflective light intensity, height, size, color, or texture of some objects.

In some instances, an autonomous vehicle may utilize more than one type of feature to identify and locate objects. For example, a sensor may provide information that allows a computing device to distinctly identify an object based on its size and reflective light intensity, such as a lane marker. An autonomous vehicle may also utilize active light source provided from traffic signals or other sources. In operation, an autonomous vehicle may utilize pattern-recognition software or other means to locate objects within the environment of the vehicle.

In one example implementation, a computing device may determine an estimated location of one or more lane markers or lane reflectors relative to a location of the vehicle. The autonomous vehicle may focus on the intensity of the lane markers or reflectors to identify the objects within information provided by sensors associated with the vehicle. A LIDAR unit may provide information that allows the computing device to determine an estimated location for each lane marker.

Along with obtaining information about the environment, various sensors and/or software may be configured to identify information relating to the objects in the environment. An autonomous vehicle may be configured to determine the orientation, size, or other parameters relating to objects within the environment based at least in part on the information provided by the vehicle sensors. An autonomous vehicle may also be equipped with different systems that contribute to the computing device being able to determine the location of objects within the environment. As an example, a tracking system may be used to track objects, and laser data points that are associated with tracked objects can be determined within LIDAR returns by a computing device. In an implementation, a computing device may be capable of identifying locations of objects based on information provided from each individual type of sensor.

In an example implementation, an autonomous vehicle may use images captured from a camera for pose estimation of objects. For example, a computing device may utilize various images to estimate the position or orientation of specific objects in the environment relative to the autonomous vehicle. A computing device may also apply object recognition software to identify learned objects within the environment.

Furthermore, a computing device may be configured to implement functions pertaining to computer vision detection. Through computer vision functions, an autonomous vehicle may be configured to perform three-dimensional analysis from two-dimensional images captured by cameras of the vehicle. In other examples, a computing device may apply functions relating to pattern recognition, which may assist in analyzing images.

An autonomous vehicle may be configured to determine orientations and locations of objects through different means. An autonomous vehicle may focus different types of sensors upon objects depending on the type of object, distance between the objects and the vehicle, and other factors.

In one example, an autonomous vehicle may estimate the location of objects using only the LIDAR unit. Similarly, the autonomous vehicle may be capable of determining an estimated location using only one type of sensor, such as a RADAR system, GPS, camera system, or other systems. In other examples, the autonomous vehicle may require multiple types of sensors to estimate locations of objects within the environment.

Referring back to the method 300 as shown in FIG. 3, at block 306, the method 300 includes receiving map data that includes location information for a plurality of objects. The map data received may include information regarding the location of objects previously identified by sensors and systems of the autonomous vehicle.

As an example, a computing device associated with a vehicle may receive map data indicative of one or more maps. In some instances, a computing device may request and/or receive maps from a network entity or another system based on a location of the autonomous vehicle. In one example, an autonomous vehicle may receive map data based on a search performed relating to an object in the environment of the autonomous vehicle. In some instances, a computing device may analyze information provided by sensors to determine which maps to retrieve in order to perform the calibration. The computing device may determine the objects detected by the sensors and retrieve a map or maps that include information relating to the objects. For example, an autonomous vehicle may receive map data based on a bridge identified within images provided by the camera system of the vehicle. In implementations, a computing device of an autonomous vehicle may receive the map through wireless or wired transmission.

In one example, a computing device of an autonomous vehicle may search a database of maps to acquire map data that provides the appropriate information for allowing calibration of vehicle sensors. The computing device may utilize map-search software or algorithms capable of identifying appropriate maps for the calibration. The database may be updated periodically or may be updated through user request. An autonomous vehicle may have the maps stored within memory on the vehicle or may access the maps wirelessly.

Within examples, an autonomous vehicle may utilize maps in the form of various types. In some instances, a computing device may receive map data indicative of one or more road maps. The road maps may show highways and roads as well as other entities like airports, city locations, and points of interest. Points of interest may include, but are not limited to parks, campgrounds, monuments, road signs, and mile markers, etc. Within road maps, a computing device may be capable of distinguishing the different roads, locations and orientations of objects, and other information.

In some instances, a computing device may receive map data indicative of other types of maps, such as physical maps and topographic maps. The computing device may receive other types of maps in addition to road maps. In another example, an autonomous vehicle may be configured to develop map data as the vehicle travels.

An autonomous vehicle may be configured to receive map information from the GPS associated with the autonomous vehicle. Similarly, an autonomous vehicle may receive map data based on the location of the autonomous vehicle as determined by the GPS of the vehicle. For example, a GPS of an autonomous vehicle may cause a computing system to receive map data based on the latitude and longitude of the vehicle. In some implementations, a computing device may utilize further information from other sensors in addition to GPS location to determine which maps to receive to calibrate sensors.

The computing device may be configured to search for map data based on objects detected by sensors. For example, a computing device may receive information indicative of a traffic sign and use the traffic sign to select map data that contains information including the traffic sign. In some instances, the computing device may use the traffic sign along with GPS information to determine maps to utilize for the calibration of vehicle sensors. In examples, an autonomous vehicle may receive map data is capable of being altered by a computing device. The computing device may be able to scale in or out upon the map and search for different types of details within the map. Other example implementations involving an autonomous vehicle receiving a map or maps may exist as well.

At block 308, the method 300 includes determining a given location for the one or more objects as specified in the map data. As an example, a computing device associated with the autonomous vehicle may be configured to identify a location for objects within the map. The computing device may utilize map-analysis software and/or algorithms to identify locations of specific objects within the map.

In one example, a computing device associated with an autonomous vehicle may be configured to analysis received maps individually. A computing device may analyze a map entirely prior to analyzing additional maps. In other examples, a computing device may compare multiple maps simultaneously. In some instances, a computing device may be configured to receive a single map based on the objects detected by the sensors. In another implementation, a computing device may be configured to receive multiple maps based on the location of the autonomous vehicle.

A computing device may receive a variety of information from a map or maps. In some implementations, a computing device may use maps to determine relative distances between objects. The autonomous vehicle may be configured to determine the approximate location of the vehicle within the boundaries of the map and determine a distance between the approximated location of the vehicle and objects in the map. In other implementations, a computing device may receive additional information relating to objects within the map, such assize or orientations of objects within the boundaries of the map.

The computing device may be configured to scan the received maps based on distinguishable features present on objects in the environment if to detect the location of the objects within the maps. The computing device may first determine objects with easily identifiable features and utilize the features when analyzing the maps. By searching for features, the computing device may be able to determine the location of objects in less time. An autonomous vehicle may analyze maps using other means as well.

At block 310, the method 300 includes performing a comparison between the estimated location of the one or more objects based on the information from the sensor and the given location for the one or more objects as specified in the map data. Within examples, a computing device or another entity associated with an autonomous vehicle may compare the location of objects or other parameters as described by the vehicle sensors and the received map. In some implementations, the computing device associated with an autonomous vehicle may adjust a sensor in a variety of ways based on the results of the comparison between information provided by the sensor and information proscribed within a map.

A computing device may compare the locations of objects as identified by a sensor or sensors and as shown within a map or maps. The computing device may compare if the locations match exactly. In some instances, the computing device may determine that a sensor or sensors should be adjusted based on the sensors determining objects in the location of the environment do not exactly match the locations given in the map. In other implementations, the computing device may determine that sensors may require calibration if the locations of objects identified by the sensor or sensors do not match the location of the objects as specified in the map to a certain degree or threshold.

An autonomous vehicle may be configured to compare the orientation, size, or other information as determined by the vehicle sensors and as provided by the map data. The autonomous vehicle may use the comparison to determine if a sensor is providing inaccurate information. For example, an autonomous vehicle may determine that a camera within the camera system of the vehicle requires an adjustment since the images provided by the camera do not accurately reflect the information provided by a road map. Similarly, an autonomous vehicle may determine based on the comparison that additional sensors, such as the RADAR or LIDAR, may require adjustments if the sensor information does not match the information provided by a map.

In an example, a computing device may compare other known properties of objects detected within in the environment and specified within the map. The computing device may compare the detected orientation or size of objects as determined from sensors information and provided by the map data.

At block 312, the method 300 includes based on the comparison, providing instructions to configure the at least one sensor. A computing device may provide instructions to various systems of an autonomous vehicle to calibrate sensors based on the comparison. In some implementations, the computing device may utilize the comparison with other information to determine if a sensor should be calibrated.

As discussed, the computing device may compare the locations of objects as identified by a sensor or sensors of the vehicle with the locations as described by a map or maps. The computing device may analyze the comparison for different information. In one implementation, the computing device may use the comparison to determine if sensors identify the location of objects directly the same as the maps show the objects to be located. If the locations differ, the computing device may use the difference as a measurement tool to adjust the sensor or sensors accordingly to match the map.

In an example, a computing device may use the comparison to determine if a sensor or sensors of the vehicle are correctly positioned or have the proper orientation. The computing device may use the map as a guide to reposition the sensor. Within other examples, a computing device may use the comparison as a guide to alter other parameters of a sensor or sensors, such as the intensity of the sensor or the direction-of-focus. An autonomous vehicle may be capable of calibrating different types of sensors at the same time. In addition, the autonomous vehicle may be configured to adjust more than one parameter associated with a sensor, such as adjusting the intensity and the orientation of the sensor.

Within examples, a computing device may relay instructions to adjust a sensor or sensors through wireless or wired transmission links. The computing device may provide instructions to systems to maintain vehicles in the current position and orientation based on the results of the comparison. The comparison between the sensor information and map information may show that the sensors and map identify the objects in the same location. In response, the computing device may not adjust any sensors.

In some examples, a computing device may provide instructions to adjust specific sensors based on the comparison of location of objects as identified by the specific sensors and location of the same objects as proscribed by the map data.

As an example, a computing device may provide instructions to adjust the intensity level of a sensor associated with the vehicle based on the given location of objects as specified in the map. The computing device of an autonomous vehicle may adjust the intensity of a sensor, such as the LIDAR unit.

In another example, a computing device may provide instructions to adjust the position of a sensor based on the information received within the map data. For example, the computing device may adjust the position of one or more cameras based on the comparison of the camera images with the road map data.

In some instances, a computing device may provide instructions to configure a sensor to adjust a direction-of-focus of the sensor based. The computing device may provide instructions based on determining that the information received from utilizing a map shows a difference in the direction-of-focus of the sensor. For example, an autonomous vehicle may adjust the direction of focus of the RADAR system or cameras on the vehicle.

Within an example, a computing device may provide instructions to a system of the vehicle to adjust a timer associated with a sensor, such as an internal timing mechanism, based on a location comparison between sensor data and objects as specified in a received map. An autonomous vehicle may adjust the timing of a system or sensor to provide information that correlates to the information provided by road maps. In addition, the computing device may provide instructions to a system to adjust the operation schedule of a sensor based on the comparison.

In other examples, the method 300 may further include an autonomous vehicle generating maps simultaneously as a computing device also calibrates sensors according to the newly generated maps. The autonomous vehicle may be configured to utilize the generated maps to calibrate different types of sensors.

In examples, a computing device may be configured to utilize road maps to determine lane position on a road. For instance, a computing device may receive a road map that provides information regarding lane boundaries. A computing device may use the information provided by the road map to calibrate sensors that assist in positioning an autonomous vehicle in a lane.

In some examples, additional data may be considered (in addition to road maps) to further calibrate one or more sensors of a vehicle, or to provide a higher probability or confidence when calibrating sensors. Further, a computing device may be configured to utilize multiple maps to adjust sensors.

In an example, an autonomous vehicle may calibrate vehicle sensors by comparing sensor information identifying a bridge or another object compared to the location information of the map as provided by a map. The autonomous vehicle may utilize additional information from the map data to supplement to the analysis regarding the location of the objects according to the map data. In other examples, an autonomous vehicle may use other objects or locations, such as street signs, intersections, or lane markers. Other examples for calibrating vehicle sensors may exist as well.

III. Example Implementations

Figures 4A, 4B:
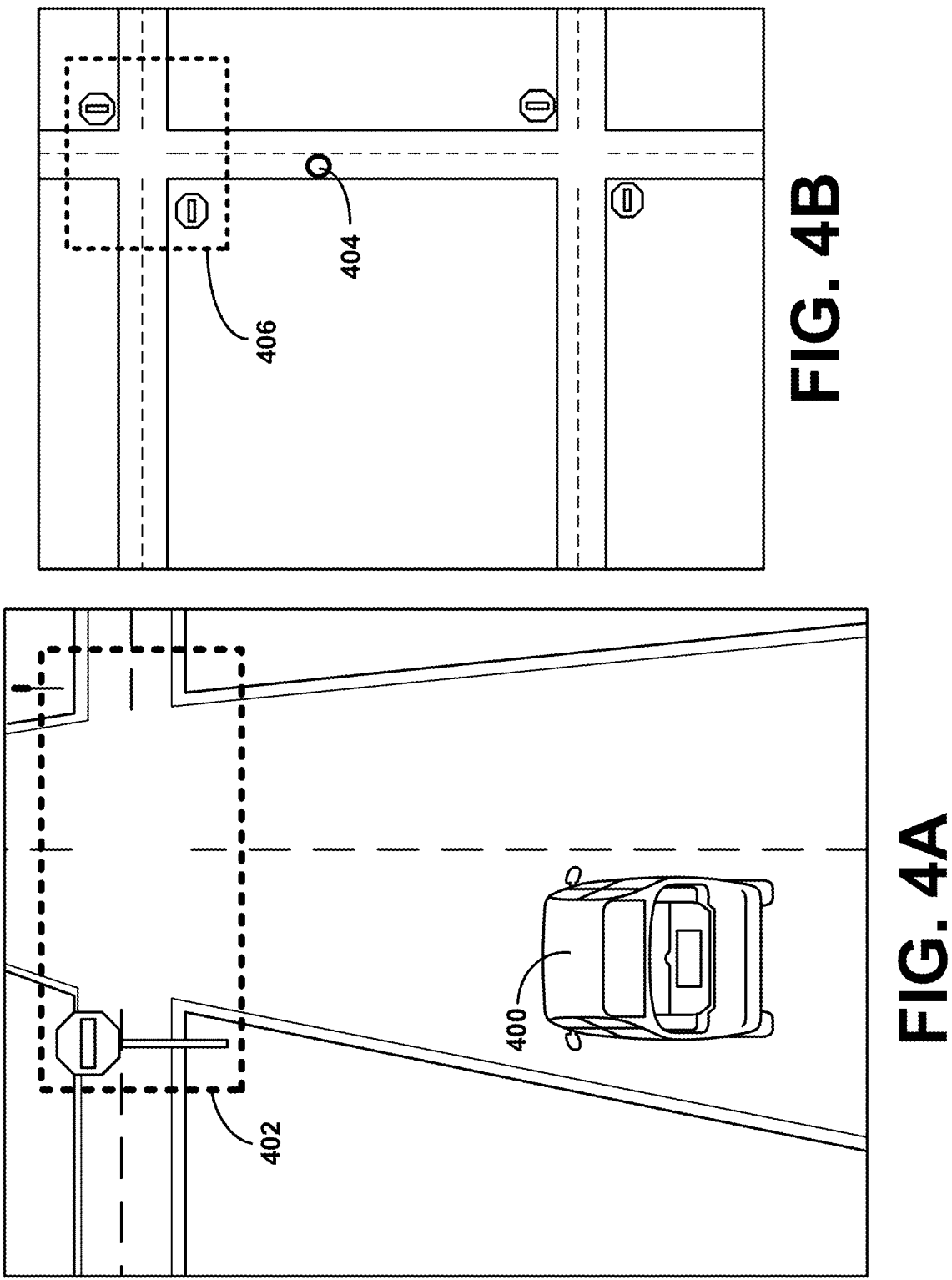
FIGS. 4A-4B depict a conceptual illustration of an example for calibrating sensors using road maps.

FIGS. 4A-4B show a conceptual illustration of an example for calibrating sensors using road maps, in accordance with example embodiments. As shown in the example, FIG. 4A includes an autonomous vehicle 400 navigating a path of travel on a road, which may also be utilizing information provided by sensors associated with the vehicle. The autonomous vehicle may be configured to calibrate various sensors as the vehicle travels to ensure the accuracy of different systems, for example.

The autonomous vehicle 400 may determine when to stop or accelerate based on information provided by different vehicle sensors. For example, the autonomous vehicle 400 may utilize camera systems or LIDAR to determine that an intersection is on the path of travel. The autonomous vehicle may use images received from the camera system to determine that the vehicle may need to stop at the intersection.

In order to calibrate sensors, the autonomous vehicle 400 may be configured to receive road maps that may enable a comparison to be performed between sensor information and map information to adjust sensors. The autonomous vehicle may position or alter other parameters of a sensor to enable the sensor to provide information that matches the information provided by a map. As shown in the example, the autonomous vehicle 400 may use the upcoming intersection of the road and a road map to calibrate the sensors. The autonomous vehicle 400 may be navigating a path of travel utilizing various systems and sensors and make a determination that a sensor requires calibration. In other examples, the autonomous vehicle may calibrate the sensors periodically.

Different sensors may identify the upcoming intersection as the autonomous vehicle 400 continues to travel. The autonomous vehicle may use various sensors, such as GPS, RADAR, LIDAR, cameras, or other sensors, to determine that intersection 402 is within the environment of the vehicle. In response, a computing device of autonomous vehicle 400 may receive map data indicative of information relating to the intersection 402. The computing device may acquire the map data through a request with to another entity or may retrieve the map data from memory. The map may include information relating to the location of the autonomous vehicle. An autonomous vehicle may acquire the map data from a database or other means. The map data is shown as a road map in FIG. 4B.

As discussed, FIG. 4B illustrates an example road map that the autonomous vehicle 400 may utilize to calibrate vehicle sensors. The map shown in FIG. 4B illustrates merely one example road map and may vary in other examples. The road map shows the location of the autonomous vehicle 400 as dot 404 on the road. The dot 404 may act as a reference point within the map. In other examples, the road map may not include the location of the autonomous vehicle. The road map shown in FIG. 4B also includes intersection 402 as shown inside box 406. An autonomous vehicle may use the map to determine the distance between the vehicle and the intersection or other information.

Within other examples, the map may include additional points of interest. An autonomous vehicle may use any number of points of interest to calibrate different types of sensors. The autonomous vehicle may compare information provided by a RADAR system about a point of interest, such as a building, and the information provided by a map about the building. For example, the autonomous vehicle may compare the orientation and location as determined by the RADAR system and as provided by the map. In some instances, the map may provide information to the autonomous vehicle based on the position of objects relative to the current position of the vehicle.

Receiving the road map as shown in FIG. 4B, the autonomous vehicle 400 may calibrate various sensors based on a comparison of the information provided by the vehicle sensors and the information provided by the map. The autonomous vehicle 400 may utilize road map shown in FIG. 4B to calibrate sensors based on the location of the intersection as provided by the road map and according to the vehicle sensors.

To identify differences between the sensors and the map, an autonomous vehicle may be configured to perform one or more comparisons based on information shown by the road map and according to vehicle sensors. A computing device may analyze the information provided by the two sources to different degrees. For example, the computing device may require that the sensors provide location information about objects within a threshold match of the information as indicated by a map.

The autonomous vehicle may adjust various parameters associated with the different types of vehicle sensors. For example, the autonomous vehicle may adjust the LIDAR unit based on the distance between the vehicle and the intersection provided by the map. Similarly, the autonomous vehicle may be configured to adjust the RADAR system, cameras, GPS, or other sensors. Within examples, an autonomous vehicle may be configured to make minor adjustments, such as slightly repositioning a camera or adjusting the height of the RADAR system. Similarly, an autonomous vehicle may make major adjustments, such as resetting a system or sensor completely.

In one example, the autonomous vehicle 400 may adjust sensors based on the location of the sign. The autonomous vehicle 400 may compare the location of the sign as described by sensors and the location as shown by the road map. Based on the comparison, the autonomous vehicle may adjust sensors if the locations do not match. For example, a computing device may adjust vehicle cameras based on images received by the cameras and the information provided by the road map shown in FIG. 4B. In some instances, the autonomous vehicle 400 may receive other maps in addition to the road map shown in FIG. 4B.

Figure 5:
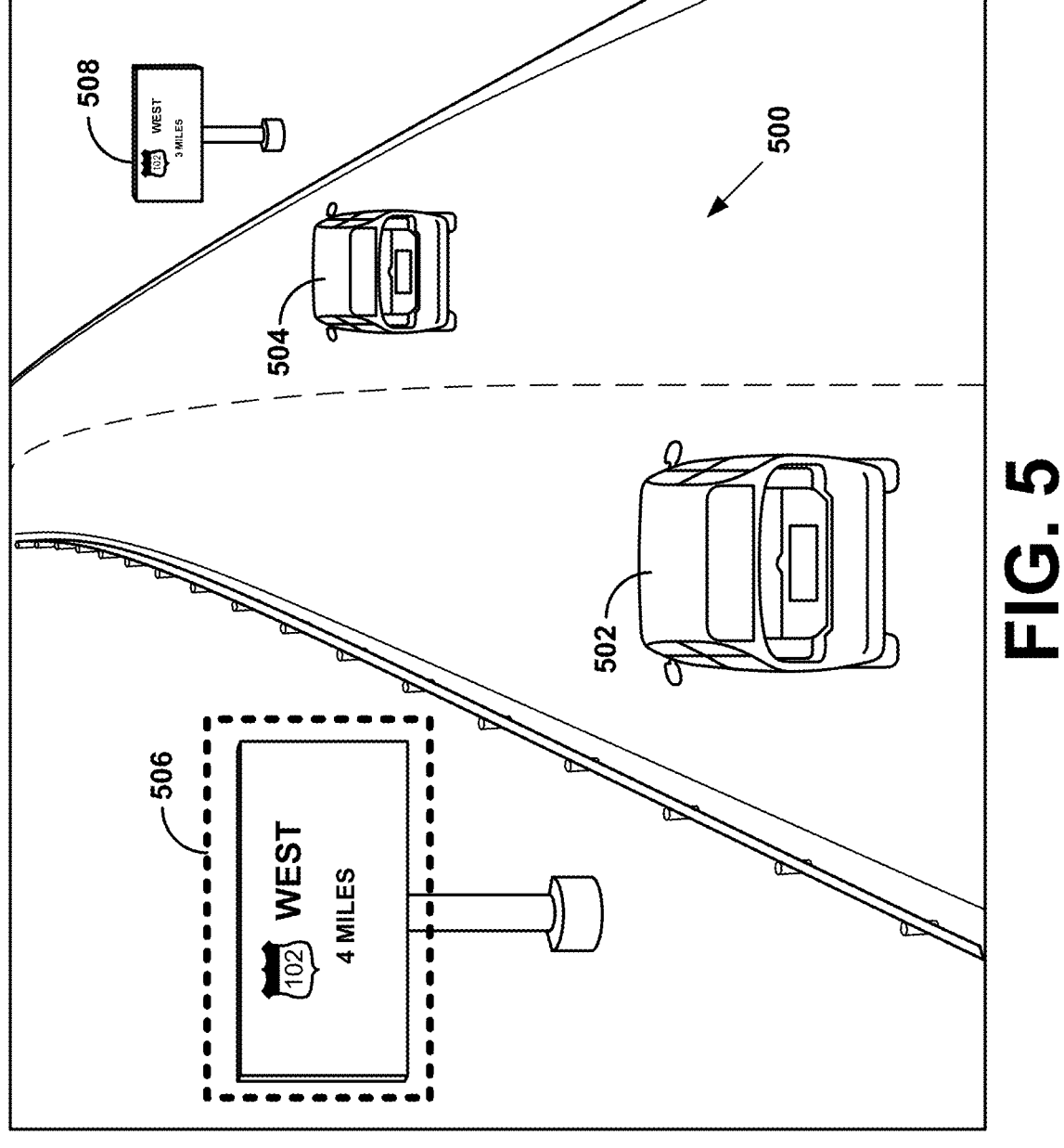
FIG. 5 is another conceptual illustration of an example for calibrating sensors using road maps.

FIG. 5 is another conceptual illustration of an example for calibrating sensors using road maps. The example shown illustrates a pair of vehicles navigating autonomously on a road 500. Within the example illustration, the autonomous vehicles 502-504 may update vehicle sensors through making adjustments to the position, orientation, direction-of-focus, or other parameters of the sensors. In some examples, an autonomous vehicle may adjust the intensity of lasers emitted by the sensor, accuracy, focus, or additional parameters associated with vehicle sensors. Further, an autonomous vehicle may adjust an operation schedule of a sensor or an internal timing mechanism of a sensor. In order to calibrate sensors, an autonomous vehicle may utilize information received from the sensors and perform a comparison of the information with similar data as provided within road maps. The autonomous vehicle may determine that adjustments may be made to a sensor after determining that the sensor information does not properly match the data as provided by a map, such as a road map.

As shown within the example, the road 500 represents a highway, but may represent other types of roads or surfaces capable of supporting the navigation of vehicles. The example illustrates the road 500 as a one-directional road for vehicles to travel, but may vary in other examples. Here, the road 500 may include lane markers or lane stripes that establish lane boundaries for vehicles.

The autonomous vehicles 502-504 may be navigating along the road 500 utilizing various systems and sensors to assist with travel and to avoid collisions. The autonomous vehicles 502-504 may represent any type of vehicle, including the vehicle 100 and the vehicle 200 as shown in FIGS. 1-2. As represented by autonomous vehicle 502, each vehicle may include various systems and sensors as previously identified, such as RADAR, LIDAR, cameras, and GPS. The various types of sensors may provide a variety of information to a computing device or devices controlling an autonomous vehicle. The sensors may be utilized continuously or at various periods by a computing device. Further, an autonomous vehicle may be configured to control systems and sensors through various software implementations.

The different sensors may require calibration periodically to maintain accuracy and proper function. Different sensors may utilize calibration at various rates. For example, an autonomous vehicle may be configured to calibrate a camera system of the vehicle more often than the GPS or LIDAR unit. Other examples may exist as well. An autonomous vehicle may constantly run calibration software to determine if sensors require adjustments. For example, an autonomous vehicle may adjust the intensity of lasers emitted by a LIDAR unit based on the information provided by a map compared to returns by the LIDAR unit.

In an example, an autonomous vehicle may be positioned in an environment designed and maintained for calibrating the vehicle sensors. Objects may be positioned and altered to calibrate the sensors. However, in other examples, the autonomous vehicle 502 may be configured to calibrate sensors while traveling. Adjusting sensors while traveling may allow an autonomous vehicle to continue along a path of travel without stopping or altering its path. Within examples, the autonomous vehicle may utilize objects that typically appear in the environment of vehicles rather than a designated environment designed for calibration purposes. The autonomous vehicle may use lane markers, traffic signs, intersections, bridges, or other objects to adjust sensors.

The autonomous vehicles may be configured to calibrate vehicle sensors continuously or may be configured to perform the calibration process periodically or when required. In some implementations, an autonomous vehicle may calibrate sensors on a predefined schedule or pattern. The autonomous vehicle 504 may be configured to calibrate various sensors through detecting objects within the surrounding environment of the vehicle and comparing the information provided regarding the detected objects with information provided by maps.

In one such example, the autonomous vehicle 504 may not be capable of utilizing the traffic sign 506 for calibration purposes any longer as shown in the example since the autonomous vehicle 504 has traveled a distance past the traffic sign 506. The autonomous vehicle 504 may utilize the traffic sign 508 shown in the distance within the example. The autonomous vehicle 504 may be configured to use other objects in addition to traffic signs 506-508 to calibrate sensors.

The traffic signs 506-508 may represent any type of sign, such as a highway sign, traffic sign, a billboard. Traffic signs may be placed on the side of or above roads to provide information to road users. The traffic signs 506-508 may be capable of transmitting information to computing devices via wireless transmission. The traffic signs represent possible objects an autonomous vehicle may utilize to adjust sensors.

In an example, a camera system associated with an autonomous vehicle may capture images of the traffic signs. An image-detection software or algorithm may be utilized by a computing device to determine information provided by the traffic signs. Based on information obtained from images captured by the cameras, a computing device may retrieve map data that matches the information.

As an example, an autonomous vehicle 502 may receive map data which includes the road 500 and the traffic signs 506-508. In one example, the autonomous vehicle 502 may receive information that does not include both traffic signs based on the scaling or size of the map data received. The map data received by the autonomous vehicle 502 may vary in details and the objects included. Furthermore, the autonomous vehicle may receive different types of maps as discussed previously.

Various maps may be utilized by the autonomous vehicles shown in the example. The autonomous vehicle may receive road maps or other types of maps to compare information provided by sensors and information as provided within a map. The autonomous vehicle may compare locations of objects as identified by sensors and locations of the same objects as provided by a map. The autonomous vehicle may calibrate various sensors based on the comparison.

In an example, the autonomous vehicle 502 may receive map data wirelessly from a server or another type of entity. Similarly, the autonomous vehicle 502 may receive map data from the autonomous vehicle 504 or another vehicle. The autonomous vehicle 504 may have generated the map data while traveling that path and may be configured to relay the map data to other vehicles.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving, at a computing system and from a first set of sensors coupled to a first vehicle, first sensor data depicting an environment of the first vehicle;
based on the first sensor data, generating first map data that represents the environment of the first vehicle;
receiving, at the computing system and from a second set of sensors coupled to a second vehicle, second sensor data depicting the environment of the second vehicle, wherein the second sensor data is collected later in time than the first sensor data;
based on the second sensor data, generating second map data that represents the environment of the second vehicle; and
transmitting the second map data to the first vehicle.

2. The method of claim 1, wherein receiving first sensor data depicting the environment of the first vehicle comprises:
receiving first sensor data depicting a first area of the environment of the first vehicle; and
wherein receiving second sensor data depicting the environment of the second vehicle comprises:
receiving second sensor data depicting a second area of the environment of the second vehicle.

3. The method of claim 2, wherein at least a portion of the second area overlaps with a portion of the first area; and
wherein transmitting the second map data to the first vehicle comprises:
transmitting the second map data corresponding to the portion of the second area that overlaps with the portion of the first area.

4. The method of claim 1, wherein receiving first sensor data depicting the environment of the first vehicle comprises:
receiving first lidar data depicting the environment of the first vehicle; and wherein receiving second sensor data depicting the environment of the second vehicle comprises:
receiving second lidar data depicting the environment of the second vehicle.

5. The method of claim 4, further comprising:
receiving first image data from one or more cameras coupled to the first vehicle, wherein the first image data represents the environment of the first vehicle; and
receiving second image data from one or more cameras coupled to the second vehicle, wherein the second image data represents the environment of the second vehicle.

6. The method of claim 1, wherein the first vehicle is configured to:
detect, using sensor data, an object in the environment of the first vehicle;
identify a position of the object in the second map data; and
determine a location of the first vehicle based on the position of the object in the second map data.

7. The method of claim 1, further comprising:
determining a location of a third vehicle; and
transmitting the second map data to the third vehicle based on the location of the third vehicle.

8. The method of claim 1, wherein the first vehicle is configured to perform a sensor calibration process using the second map data.

9. The method of claim 1, wherein receiving the first sensor data depicting the environment of the first vehicle comprises:
receiving the first sensor data representing the environment measured during a first route traveled by the first vehicle; and
wherein receiving the second sensor data depicting the environment of the second vehicle comprises:
receiving the second sensor data representing a second route traveled by the second vehicle.

10. The method of claim 1, wherein generating first map data that represents the environment of the first vehicle comprises:
generating a first set of road maps that represent the environment of the first vehicle; and
wherein generating second map data that represents the environment of the second vehicle comprises:
generating a second set of road maps that represent the environment of the second vehicle.

11. The method of claim 10, wherein the first set of road maps and the second set of road maps convey road boundaries and one or more points of interest.

12. A system comprising:
a first vehicle;
a second vehicle; and
a computing system configured to:
receive, from a first set of sensors coupled to the first vehicle, first sensor data depicting an environment of the first vehicle;
based on the first sensor data, generate first map data that represents the environment of the first vehicle;
receive, from a second set of sensors coupled to the second vehicle, second sensor data depicting the environment of the second vehicle, wherein the second sensor data is collected later in time than the first sensor data;
based on the second sensor data, generate second map data that represents the environment of the second vehicle; and
transmit the second map data to the first vehicle.

13. The system of claim 12, wherein the first set of sensors coupled to the first vehicle includes a first camera and a first lidar, and wherein the second set of sensors coupled to the second vehicle includes a first camera and a first lidar.

14. The system of claim 12, wherein the computing system is positioned remotely from the first vehicle and the second vehicle.

15. The system of claim 12, wherein the computing system is configured to generate first road maps based on the first sensor data and second road maps based on the second sensor data.

16. The system of claim 12, wherein the computing system is further configured to:

provide instructions to the first vehicle, wherein the instructions specify to use the second map data to calibrate one or more of the first set of sensors coupled to the first vehicle.

17. A non-transitory computer readable storage medium having stored therein instructions, that when executed by a computing device, cause the computing device to perform functions comprising:

receiving, from a first set of sensors coupled to a first vehicle, first sensor data depicting an environment of the first vehicle;

based on the first sensor data, generating first map data that represents the environment of the first vehicle;

receiving, from a second set of sensors coupled to a second vehicle, second sensor data depicting the environment of the second vehicle, wherein the second sensor data is collected later in time than the first sensor data;

based on the second sensor data, generating second map data that represents the environment of the second vehicle; and transmitting the second map data to the first vehicle.

18. The non-transitory computer readable storage medium of claim 17, further comprising:

modifying a map of the environment to include the first map data; and subsequently modifying the map of the environment to include the second map data.

19. The non-transitory computer readable storage medium of claim 18, wherein transmitting the second map data to the first vehicle comprises:

transmitting the map of the environment comprising the second map data to the first vehicle.

20. The non-transitory computer readable storage medium of claim 18, wherein the functions further comprise:

determining a location of a third vehicle; and transmitting the second map data to the third vehicle based on the location of the third vehicle.

* * * * *